United States Patent Office 3,803,127
Patented Apr. 9, 1974

3,803,127
N-SUBSTITUTED HETEROCYCLIC AMINES
William R. N. Williamson, Farnham Common, England, and Winston S. Marshall, Bargersville, Ind., assignors to Eli Lilly and Company, Indianapolis, Ind.
No Drawing. Filed June 9, 1972, Ser. No. 261,460
Int. Cl. C07d 41/04
U.S. Cl. 260—239 B    6 Claims

ABSTRACT OF THE DISCLOSURE

N-alkylphenyl - heterocyclic amines and pharmaceutically acceptable acid addidtion salts thereof are useful as anti-inflammatory agents when administered to animals in doses of from 2 to 200 mg./kg. The N-alkylphenyl-heterocyclic amines are prepared by conventional techniques such as reacting a suitable halobenzene with the desired heterocyclic amine or by reacting a suitable aminobenzene with a dihaloalkane, dihaloalkylether, dihaloalkylsulphide or dihaloalkylamine.

---

This invention relates to N-substituted heterocyclic amines having anti-inflammatory activity and to methods for preparing such amines. The invention also relates to pharmaceutical compositions comprising said amines and to methods of treatment involving their use.

According to the present invention the aforesaid N-substituted heterocyclic amines have the formula:

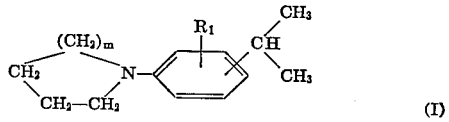

and pharmaceutically acceptable acid addition salts thereof, wherein $m$ is an integer from 1 to 3 and $R_1$ represents one or more of hydrogen, halogen, $C_{1-4}$ alkyl, nitro, amino or $C_{2-5}$ acylamino.

In the foregoing definition of compounds of Formula I, the term "$C_{1-4}$ alkyl" means straight and branched monovalent hydrocarbon chains having up to 4 carbon atoms such as methyl, ethyl, isopropyl, n-butyl, s-butyl, and t-butyl; the term "$C_{2-5}$ acyl" means the aforementioned $C_{1-4}$ alkyl groups linked through a carbonyl group; and the term "pharmaceutically acceptable acid addition salts" means non-toxic addition salts of the compounds of Formula I with suitable acids such as those with inorganic acids, for example hydrochloric, hydrobromic, nitric, sulphuric or phosphoric acids, or with organic acids, such as organic carboxylic acids, for example, acetic, glycollic, maleic, tartaric, citric, o-acetyloxybenzoic, nicotinic or isonicotinic acid, or organic sulphonic acids, for example methane sulphonic, ethane sulphonic, 2-hydroxyethane sulphonic, p-toluene sulphonic or naphthalene 2-sulphonic acid.

Within the groups of compounds defined by Formula I, there is a preferred group having superior anti-inflammatory properties wherein $m$ is as defined in Formula I, and $R_1$ represents a single hydrogen, chloro, bromo, methyl, nitro, amino or acetamido.

Exemplary of compounds falling within the scope of the present invention are:

3-bromo-4-homopiperidino cumene
4-homopiperidino cumene
3-nitro-4-homopiperidino cumen
3-homopiperidino cumene
4-chloro-3-homopiperidino cumene
4-pyrrolidino cumene
3-chloro-4-piperidino cumene
3-piperidino cumene
4-piperidino cumene
3-t.butyl-4-piperidino cumene
3-methyl-4-piperidino cumene
3-nitro-4-piperidino cumene
3-amino-4-piperidino cumene
2-bromo-4-piperidino cumene
3-acetamido-3-piperidino cumene
3-methyl-4-pyrrolidino cumene
3-chloro-4-pyrrolidino cumene.

The most preferred compounds of the invention are the 3- and 4-piperidino cumenes, the benzene rings of which are optionally substituted by chloro, bromo or methyl.

The compounds of Formula I may be made by a process comprising the reaction of a halo- or amino-benzene derivative of the formula:

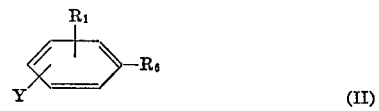

wherein $R_1$ is as defined in Formula I, $R_6$ either is or is convertible to an isopropyl group, and Y is halo or amino (provided that Y and $R_1$ are not both halo or amino) with, when Y is halo, a heterocyclic amine of the formula:

wherein $m$ is as defined in Formula I, or when Y is amino, with a compound of the formula:

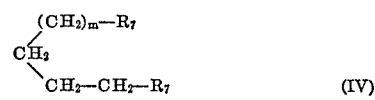

wherein $R_7$ is halo; and thereafter, where $R_6$ is not an isopropyl group, converting $R_6$ to the said group, the resultant compounds being isolated either per se or in the form of their acid addition salts.

The reaction of a compound of Formula II with compounds of Formula III or IV is known from the literature, and is generally carried out at or below room temperature or at elevated temperatures—depending on the particular reactants—in a suitable solvent such as alcohol, benzene, toluene, dimethylsulphoxide, chloroform, tetrahydrofuran or dimethylformamide. Exemplary of suitable reactants of Formula II are 5-aminocumene, 4-chlorocumene, 4-fluorocumene, 3-methyl - 4 - chlorocumene, 3-chloro-4-aminocumene, 4 - bromo - α - methylstyrene, 4 - amino-α-methylstyrene, 3-acetamido - 4 - bromo - α - methylstyrene, 3 - methyl - 4 - chloro - α - methylstyrene, 2 - bromo-4-aminocumene and 3-t.butyl-4-chlorocumene.

The amines of Formula III are pyrrolidine, piperidine and homopiperidine, while examples of suitable compounds of Formula IV are the dihaloalkanes such as 1,4-dichlorobutane, 1,4-dibromobutane, 1,5-dichloropentane, 1,5-diiodopentane, 1,6-diiodohexane, 1,6-dibromohexane, and 2,5-dichlorohexane.

As stated above, the process of the present invention includes the preparation of compounds where $R_6$ is not the desired isopropyl group and subsequent conversion of the undesired group to that group.

Suitable groups which are readily convertible to the required isopropyl group include $—CO \cdot CH_3$, $—CO_2CH_3$ and $—C(CH_3)_2 \cdot OH$. The following diagram, in which only partial structures are shown, will illustrate the reaction steps involved.

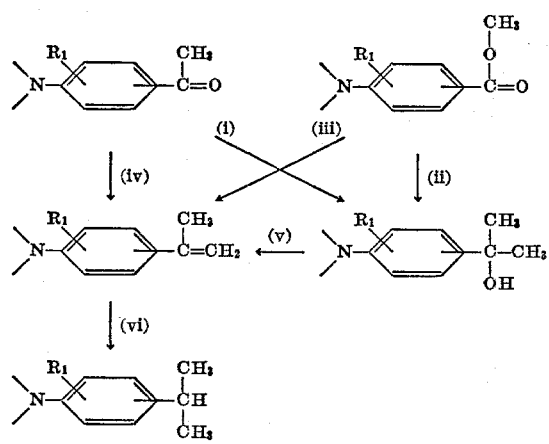

Reaction steps (i) and (ii) are carried out in a conventional manner by reacting the ketone or ester starting materials with a suitable Grignard reagent such as a methyl magnesium halide, for example methyl magnesium bromide or methyl magnesium iodide. The resultant alcohol is then dehydrated in step (v) to a α-methyl styrene derivative. Suitable dehydrating agents are 4 N aqueous sulphuric acid, heating in the presence of iodine, zinc chloride, potassium hydrogen sulphate, activated alumina at about 300° C. and heated phosphorus pentoxide as well as dehydrating agents that act by first replacing the hydroxyl with halogen such as hydrogen chloride gas in methanol or thionyl chloride in the presence or absence of pyridine. Alternatively, the Grignard intermediate may be isolated and pyrolyzed directly to the desired alkylidene derivative.

Reaction steps (iii) and (iv) are carried out in the same manner as steps (i) and (ii) except that the reaction is carried out under dehydrating conditions usually involving heating the reaction mixture to over 100° C. Step (iv) can also be carried out using the so-called Wittig reaction involving treatment of the starting material with methylene triphenyl phosphorane. The reaction is normally carried out in the solvent in which the phosphorane is prepared, such solvents including ether, benzene, tetrahydrofuran, and ethanol. The required ketone is then added to the phosphorane solution and the reactants mixed for periods of from 0.5 to 48 hr. at or about room temperature until the reaction is complete.

Step (vi) is carried out using conventional hydrogenation procedures such as, for example, hydrogen in the presence of a catalyst such as palladium on charcoal.

It will be appreciated that any substituent $R_1$ may also be converted to another substituent falling within the definition of $R_1$ in Formula I. Such a conversion may be carried out at an intermediate stage of the reaction sequence or as the ultimate step. Thus a nitro substituent may be reduced to an amino substituent using, for example, zinc and acetic acid or hydrazine hydrate and Raney nickel. An amino group may be replaced by halogen using the Sandmeyer reaction. Acyl substituents may readily be introduced using the Friedel-Crafts reaction. An amino substituent may also be acylated to give the corresponding acylamino substituent.

The compounds of Formula I may be prepared in the foregoing processes in the form of acid addition salts. Such addition salts may be converted into the free compound according to known methods, for example, by treating it with a base such as with a metal hydroxide, for example an alkali metal or alkaline earth metal hydroxide, for example lithium hydroxide, sodium hydroxide, potassium hydroxide or calcium hydroxide; a metal carbonate, such as an alkali metal or an alkaline earth metal carbonate or hydrogen carbonate, for example sodium, potassuim or calcium carbonate or hydrogen carbonate; ammonia; with a hydroxyl ion exchange preparation; or with any other suitable reagent.

A resulting acid addition salt may also be converted into another acid addition salt according to known methods; for example, a salt with an inorganic acid may be treated with a metal salt, for example sodium, barium or silver salt, or an acid in a suitable diluent, in which a resulting inorganic salt is insoluble and is thus removed from the reaction medium. An acid addition salt may also be converted into another acid addition salt by treatment with an anion exchange preparation.

A free compound may be converted into acid addition salt according to known methods, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

The compounds of Formula I have been found to be active in certain laboratory tests for anti-inflammatory activity, such as the carrageenin oedema, U.V. erythema and adjuvant arthritis tests, at doses between 1 and 200 gm./kg. The compounds of Formula I have also been found to possess very low toxicity which in terms of $LD_{50}$ in mice ranges from about 400 mg./kg. i.p. to 1600 mg./kg. p.o. and not to be irritant to the stomach as are most known acidic anti-inflammatory agents.

According to a feature of the present invention therefore, there is provided a method of treating an inflammatory condition in animals, including humans, which comprises administering to said animal an effective dose of a compound of Formula I. The effective dose for animals other than humans will normally be within the abovementioned dosage range, while for humans the dose will normally be between 2 and 25 mg./kg. repeated until the condition is relieved. It will, of course, be appreciated that the human dosage regime will be determined by a physician in the light of all the relevant circumstances including the condition to be treated, the physical condition of the patient, the choice of compound to be administered and the route of administration and therefore the above dosage range is not intended to limit the scope of the invention in any way.

The compounds of Formula I will normally be administered in composition form and accordingly the present invention also provides pharmaceutical compositions compositions comprising at least one compound of Formula I in association with a pharmaceutically acceptable carrier therefor.

The compositions of the present invention may be administered orally, parenterally or rectally in the form of, for example, tablets, capsules, suppositories or suspensions. Advantageously for this purpose, compositions may be provided in dosage unit form, preferably each dosage unit containing from 5 to 1000 mg., more advantageously 50 to 750 mg., of a compound of Formula I.

In this specification the expression "dosage unit form" is used as meaning a physically discrete unit containing an individual quantity of the active ingredient, generally in admixture with a pharmaceutical diluent therefore or otherwise in association with a pharmaceutical carrier, the quantity of the active ingredient being such that one or more units are normally required for a single therapeutic administration or that, in the case of severable units such as scored tablets, at least one fraction such as a half or quarter of a severable unit is required for a single therapeutic administration.

The formulations of the present invention normally will consist of at least one compound of Formula I mixed with a carrier, or diluted by a carrier, or enclosed or encapsulated by a carrier in the form of a capsule, sachet, cachet, paper or other container. A carrier or diluent may be a solid, semi-solid or liquid material which serves as a vehicle, excipient or medium for the active therapeutic substance. Some examples of the diluents or carriers which may be employed in the pharmaceutical formulations of the present invention are lactose, dextrose, sucrose, sorbitol, mannitol, starch, gum acacia, calcium phosphate, liquid paraffin, cocoa butter, oil of theobroma, alginates, tragacanth, gelatin, syrup B.P., methyl cellulose, polyoxyethylene sorbitan monolaurate, and methyl- and propyl-hydroxybenzoate. In the case of tablets, a lubricant may be incorporated to prevent sticking and binding of the powdered ingredients in the dies and on the punch of the tabletting machine. For such purpose, there may be employed for instance talc, aluminum, magnesium or calcium stearate or mineral oil.

The pharmaceutical formulations of the present invention may contain, in addition to the active ingredient of Formula I, one or more other pharmacologically active ingredients, for example acetylsalicylic acid, aluminium aspirin, dextropropoxyphene, caffeine, codeine phosphate, phenazone, paracetamol, phenylbutazone, indomethacin or an anti-inflammatory phenyl acetic or propionic acid.

The following examples further illustrate the invention.

EXAMPLE 1

(a) α,α-Dimethyl-p-piperidinobenzyl alcohol (4.38 g., 0.02 mole) in ethanol (60 ml.) with quinol (0.1 g.) was saturated at 0° C. with hydrogen chloride gas and then refluxed for 4 hours. The solution was evaporated to dryness and the product recrystallized from ethyl acetate to give p-piperidino-α-methylstyrene hydrochloride (4.2 g.), M.P. 180–182.5° C.

The benzyl alcohol starting material may be obtained as follows: To methyl magnesium iodide [from methyliodide (47.8 g.) and magnesium (8.07 g.)] in ether (200 ml.) was added with stirring on an ice-bath a solution of p-piperidino acetophenone (34.22 g., 0.17 mole) in ether (400 ml.). After the addition was complete, the mixture was stirred at room temperature for 2.5 hours, then cooled in a freezing mixture, and treated with 2 N hydrochloric acid (340 ml.). The acid phase was separated and the ethereal phase twice extracted with 2 N hydrochloric acid (2× 100 ml.). The combined acid solutions were treated with solid sodium carbonate until alkaline. The product was extracted 4 times with ether, the ether extracts washed with saturated sodium chloride, dried ($Na_2SO_4$) and the filtered solution evaporated to dryness leaving α,α-dimethyl-p-piperidinobenzyl alcohol (29.43 g.), M.P. 72–74° C.

(b) p-Piperidino acetophenone (0.075 mole) was added under nitrogen to a suspension in diethyl ether of methylene triphenyl phosphorane (prepared from 0.2 mole of triphenylmethylphosphonium bromide and 0.24 mole of phenyl lithium in 400 ml. of diethyl ether). The mixture was shaken for 36 hours at room temperature. The triphenylphosphine oxide adduct was filtered off, the ethereal solution washed with water and dried. Treatment with ethereal hydrogen chloride yielded p-piperidino-α-methylstyrene hydrochloride, M.P. 180–182° C. on recrystallization from ethyl acetate.

EXAMPLE 2

Thionyl chloride (1.7 g., 0.014 mole) in dry ether (5 ml.) was added with stirring over 20 minutes to a solution of 4-bromo-3-piperidino-α,α-dimethylbenzyl alcohol (4.17 g., 0.014 mole, M.P. 62–65° C.) and pyridine (1.1 g., 0.014 mole) in ether (30 ml.) at 0–5° C. The mixture was stirred for 0.5 hour, then the ether was distilled off and the residue heated with stirring for 3.5 hours, quinol (50 mg.) being added after 2 hours. The mixture was poured into sodium hydrogen carbonate (2.6 g., 0.03 mole) in water (30 ml.) and extracted three times with ether. The combined extracts were dried ($Na_2SO_4$), filtered and evaporated and the residue distilled. The resultant gummy product was leached with light petroleum (B.P. 40–60° C.), the petroleum separated and evaporated and the residue distilled to give 4-bromo-3-piperidino-α-methylstyrene (1.54 g.), B.P. 130–138° C./0.25 mm. Hg, $n_D^{26}$ 1.5845.

EXAMPLE 3

Using the methods described in Examples 1 and 2, the following alcohols:

α,α-dimethyl-m-pyrrolidinobenzyl alcohol
α,α-dimethyl-3-acetamido-4-piperidinobenzyl alcohol
α,α-dimethyl-3-methyl-4-pyrrolidinobenzyl alcohol
α,α-dimethyl-4-homopiperidinobenzyl alcohol
α,α-dimethyl-3-amino-4-piperidinobenzyl alcohol
α,α-dimethyl-3-bromo-4-homopiperidinobenzyl alcohol
α,α-dimethyl-3-chloro-4-piperidinobenzyl alcohol
α,α-dimethyl-3-acetamido-4-pyrrolidinobenzyl alcohol
α,α-dimethyl-4-nitro-3-piperidinobenzyl alcohol were dehydrated to yield respectively:

m-pyrrolidino-α-methylstyrene
3-acetamido-4-piperidino-α-methylstyrene
3-methyl-4-pyrrolidino-α-methylstyrene
4-homopiperidino-α-methylstyrene
3-amino-4-piperidino-α-methylstyrene
3-bromo-4-homopiperidino-α-methylstyrene
3-chloro-4-piperidino-α-methylstyrene
3-acetamido-4-pyrrolidino-α-methylstyrene
4-nitro-3-piperidino-α-methylstyrene.

EXAMPLE 4 p-Piperidino-α-methylstyrene hydrochloride (9 g.) in ethanol (200 ml.) was hydrogenated at room temperature and pressure over 10% palladium on charcoal (1.25 g.). When hydrogen uptake was complete the catalyst was filtered off, the solvent evaporated and the residue recrystallized from ethyl acetate-ethanol to give 4-piperidinocumene hydrochloride (6.76 g.). M.P. 200–202° C. The free base has a boiling point of 114–116.5° C./1.4–1.2 mm. Hg.

Similarly the other styrene derivatives produced in Examples 2 and 3 were reduced to yield:

4-bromo-3-piperidino cumene
m-pyrrolidino cumene
3-acetamido-4-piperidino cumene
3-methyl-4-pyrrolidino cumene
4-homopiperidino cumene
3-amino-4-piperidino cumene
3-bromo-4-homopiperidino cumene
3-chloro-4-piperidino cumene
3-acetamido-4-pyrrolidino cumene
4-nitro-3-piperidino cumene.

EXAMPLE 5

4 fluorocumene (0.2 mole) and piperidine (0.24 mole) were stirred for 3 hours at 100° C. in dimethyl sulphoxide (80 ml.) containing anhydrous potassium carbonate (0.2 mole). The reaction mixture was cooled, poured into water, extracted with ether, dried ($Na_2SO_4$), filtered and evaporated to yield 4-piperidino cumene, which was converted to its hydrochloride, M.P. 200–202° C. after recrystallization from ethyl acetate/ethanol.

Similarly the other alkyl phenyl amines described in Example 4 were prepared.

EXAMPLE 6

(a) 3-amino-4-bromoacetophenone (0.45 mole), ethylene glycol (0.45 mole), p-toluenesulphonic acid monohydrate (.036 g.) and benzene (450 ml.) were refluxed for 16 hours in a Dean and Stark apparatus. 11.5 ml. of water was collected. The solution was washed with sodium hydrogen carbonate (0.315 g.) in water (450 ml.), then with water alone and dried. After evaporation of the solvent, the residual oil was mixed with 1,5-dibromopentane (0.66 mole), anhydrous potassium carbonate (0.48 mole), cuprous iodide (0.0066 mole) and potassium iodide (0.0066 mole) in dimethyl formamide and the mixture heated at 135° C. for 4–5 hours. The mixture was poured into water (900 ml.) and extracted four times with ether. The combined extracts were dried, filtered, evaporated and the residue distilled to yield 3-piperidino- 4-bromoacetophenone, M.P. 93–94° C. on recrystallization from ethanol/light petroleum (B.P. 40–60° C.).

This ketone (28.2 g.) was reacted with methyl magnesium iodide as described in Example 1 to give 4-bromo-3-piperidino-α,α-dimethylbenzyl alcohol (29.7 g.), M.P. 62–65° C. The alcohol was treated as in Example 2 to yield 4-bromo-3-piperidino-α-methylstyrene. Reduction as described in Example 4 yielded 4-bromo-3-piperidino cumene.

(b) The above process was repeated except that the last three reactions were carried out prior to the condensation reaction. Thus the acetophenone was treated with methyl magnesium iodide, the resultant alcohol dehydrated to the α-methyl styrene which was reduced to give 4-bromo-3-aminocumene. Condensation of the latter with 1,5-dibromopentane in the manner described at (a) above yielded 4-bromo-3-piperidino cumene. The condensation was also effectively carried out using the 4-bromo-3-amino-α-methylstyrene and 1,5-dibromopentane to give 4-bromo-3-piperidino-α-methylstyrene directly.

EXAMPLE 7

By the method of Example 5 but using pyrrolidine and homopiperidine, there were obtained respectively 4-pyrrolidinocumene, B.P. 83–85° C./0.08 mm. Hg and 4-homopiperidinocumene hydrochloride, M.P. 155–160° C.

EXAMPLE 8

By the method of Example 1 but starting with 3-piperidino acetophenone, there was obtained 3-piperidino-α-methylstyrene which after reduction using the method of Example 4 yielded 3-piperidino cumene, B.P. 100° C./0.3 mm. Hg.

We claim:
1. Compound selected from the group consisting of 3-piperidinocumene, 4-piperidinocumene, 4 - pyrrolidinocumene, 4-homopiperidinocumene and pharmaceutically acceptable acid addition salts thereof.
2. The compound of claim 1 which is 3-piperidinocumene or salt thereof.
3. The compound of claim 1 which is 4-piperidinocumene or salt thereof.
4. The compound of claim 1 which is 4-pyrrolidinocumene or salt thereof.
5. The compound of claim 1 which is 4 - homopiperidinocumene or salt thereof.
6. Compound selected from the group consisting of 3-piperidinocumene, 4-piperidinocumene, and derivatives thereof substituted in the benzene rings by chloro, methyl, or bromo.

References Cited
FOREIGN PATENTS
917,253   1/1963   Great Britain _____ 260—293.72

JOHN D. RANDOLPH, Primary Examiner
G. T. TODD, Assistant Examiner

U.S. Cl. X.R.
260—239 BF, 293.72, 293.77, 293.79, 326.3, 326.8, 326.85, 295 S, 295.5 S; 424—244, 267, 274